Oct. 22, 1957
R. C. KIRK
2,810,636
METHOD FOR PRODUCING SODIUM
Filed June 4, 1956
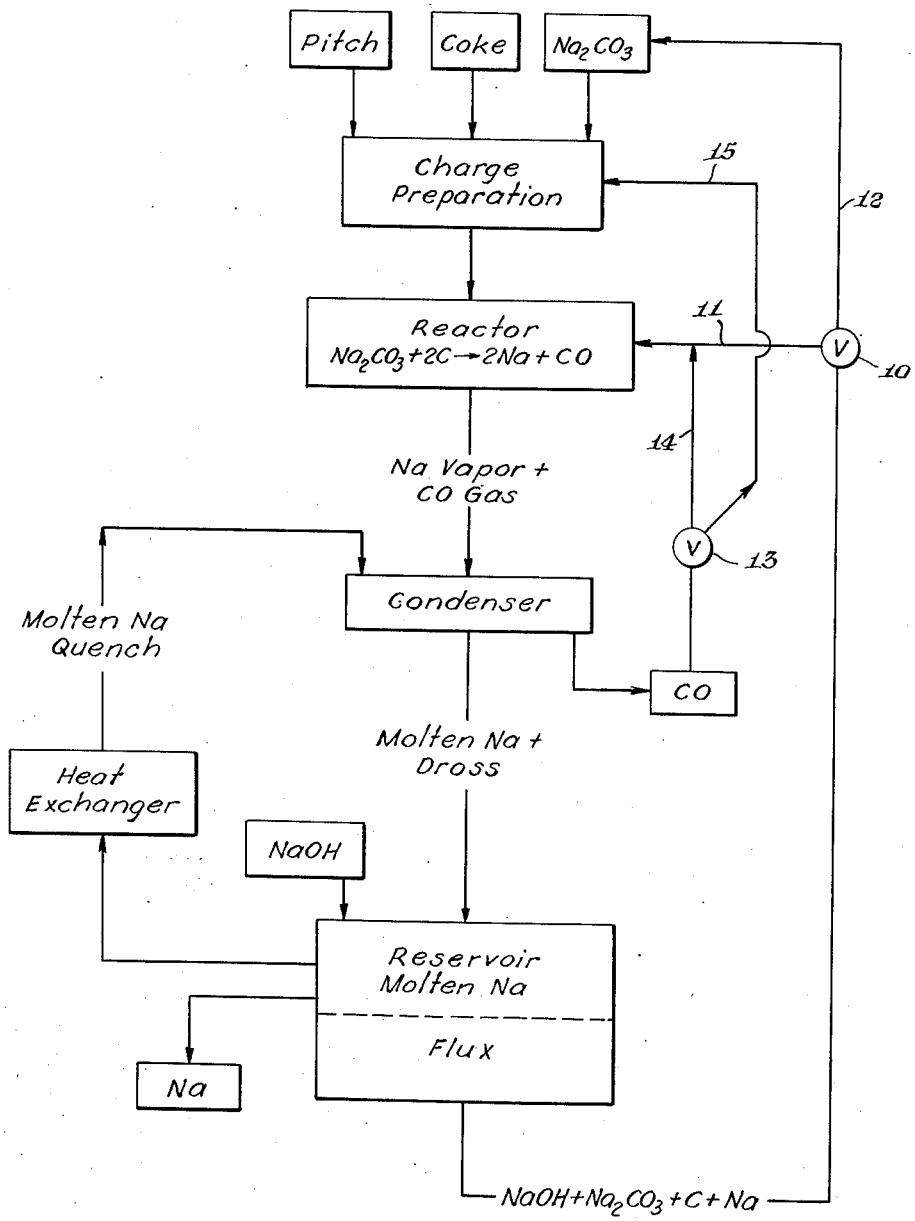
INVENTOR.
Roy Charles Kirk
BY
Griswold & Burdick
ATTORNEYS United States Patent Office 2,810,636
Patented Oct. 22, 1957

2,810,636
METHOD FOR PRODUCING SODIUM

Roy Charles Kirk, Midland, Mich., assignor to The Dow Chemical Company, Midland, Mich., a corporation of Delaware Application June 4, 1956, Serial No. 589,198

7 Claims. (Cl. 75—66)

This invention relates to a process for producing sodium and is particularly directed to an improved cyclical method of making sodium by the carbothermic reduction of sodium carbonate.

The carbothermic process of producing sodium by reducing sodium carbonate with carbon in a high temperature reactor is known and is described, for example, in United States Patent No. 2,391,728, patented December 25, 1945. In general, this process comprises charging sodium carbonate and carbon to a high temperature reactor in which the carbon reduces the sodium carbonate to sodium vapor, and carbon monoxide is produced as a by-product. These gases are then passed through a condenser in which they are directly contacted with a quench metal so as to rapidly chill the sodium vapor and prevent reaction with the carbon monoxide. In the process of condensing the sodium vapor, some dross is formed and must be separated from the molten sodium. This can be accomplished by fluxing the dross from the mixture of molten sodium and dross by adding thereto sodium hydroxide, but the amount of sodium hydroxide required for this fluxing operation is such that approximately 0.575 mole of sodium (in the form of the hydroxide) must be added for each mole of sodium recovered. Thus, allowing also for reversion, this process can never exceed a maximum of about fifty percent efficiency unless the sodium values in the flux are recovered. This flux can not be fed directly back into the high temperature reactor, however, because the high sodium hydroxide content thereof would react with the graphite lining of the reactor and destroy it within a relatively short period of time.

It is an object of this invention, therefore, to provide a cyclical process for producing sodium wherein substantially all of the sodium values are recovered from the flux in the high temperature thermal production of sodium. Another object of this invention is to provide a cyclical process for producing sodium by the carbothermic reduction of sodium carbonate wherein the by-products of the carbothermic reaction are so combined that they provide additional charge materials for the high temperature carbothermic reaction. Other objects of this invention will become apparent from the following detailed description thereof when read in conjunction with the accompanying drawing, which represents a flow sheet illustrating the present invention.

In practicing the process of the present invention in the manner described above in connection with Patent No. 2,391,728, sodium carbonate is reduced with carbon in a high temperature reactor. The charge of sodium carbonate and some suitable form of carbon such as coke is fed to the reactor in which the pressure and temperature are so regulated as to produce sodium vapor and carbon monoxide. The sodium vapor and carbon monoxide are forced out of the reactor and into a condenser into intimate contact with a quench metal such as molten lead, molten sodium or a mixture thereof. Some dross is inevitably formed during this condensation operation and is separated from the molten sodium by fluxing with sodium hydroxide.

It has been discovered that the carbon monoxide which is obtained as a by-product from the reaction of carbon with sodium carbonate will react with the sodium hydroxide in the flux at temperatures of at least 318° C. (at which temperature the sodium hydroxide is fluid or molten) to produce sodium carbonate. The thus treated flux may then be fed into the reactor with added carbon to produce more sodium, since the higher melting sodium carbonate does not attack the graphite lining of the reactor. In this manner a cyclical process is obtained which recovers almost 100 percent of the sodium values present. Since the sodium values in the dross are almost entirely recovered, economical modifications of the sodium carbonate reduction process which previously could not be employed because of increased dross formation can now be effected. For example, the substitution of a sodium quench for a lead quench, with the accompanying elimination of distillation operations, may be economically employed in spite of substantial increases in the amount of dross formed.

In describing the present invention in detail, reference is made to the accompanying drawing which comprises a flow sheet illustrating the present process. A charge is made up for the reactor by combining pitch, coke and sodium carbonate in the form of briquettes. While coke is a preferred source of carbon, some pitch is desired for use as a binder in the briquetting operation. By combining the carbon and sodium carbonate in intimate mixture in briquettes, the sodium carbonate preferentially reacts with the carbon rather than the graphite liner in the reactor. Also, briquetting provides the added function of reducing the fines which contribute materially to the amount of dross formed in the condenser. The briquetted charge is then fed into the reactor by a suitable conveyor, such as a screw conveyor. In this specific example, the reactor is an electric arc furnace having a graphite lining and operating at a temperature between 850 and 1300° C. Preferably the temperature in the reactor is at least 1200° C. The pressure within the reactor must exceed that in the condenser in order to force sodium vapor from the reactor into the condenser. Reactor pressures in excess of one atmosphere are not generally employed, and it is preferable to maintain the pressure at about 0.5 atmosphere.

The sodium vapor and carbon monoxide gas produced in the reactor are forced out of the reactor through an orifice into a condenser which is maintained at a pressure lower than that of the reactor, preferably about 0.03 atmosphere. The temperature of the quench metal in the condenser is preferably maintained at approximately 300° C., although it may range from as low as 290° C. up to as high as 500° C. The condenser may be constructed in various ways, and one form which has been found satisfactory comprises a series of curtains of molten quench metal which intimately contact the sodium vapor to rapidly chill and condense it. The quench metal may be sodium, lead or mixtures of the two metals, although in this particular illustration sodium is employed. The carbon monoxide is not condensed by the sodium quench and is vented from the condenser in the gaseous state into a reservoir, or is used directly by passing it through valve 13 as hereinafter set forth. There is a certain amount of reversion of the sodium vapor and carbon monoxide gas to produce sodium carbonate. This carbonate along with carbon, oxides, and unreacted charge becomes intermixed with the molten sodium to produce dross. This dross passes with the molten sodium into a reservoir where flake sodium hydroxide is added to flux the dross from the sodium. The temperature of the sodium in the reservoir must be within the range of 290° C. to 500° C. in order to prevent reaction with the sodium hydroxide. Preferred temperatures of the reservoir metal range from 360° C. to 380° C. The freed sodium is then drawn off at a predetermined rate, part of it being recirculated through a heat exchanger for use as a quenching medium and the remainder being separated as the end product. The hot fluid flux, which consists principally of sodium hydroxide and sodium carbonate, along with some unreacted carbon and occluded sodium, is drawn off from the bottom of the reservoir.

Up to this point the flow sheet process is quite similar to that disclosed in Patent 2,391,728. The primary distinction resides in the use of a sodium quench rather than the lead quench disclosed in the patent, which requires a still for recovering the molten sodium from the molten lead. Of course, the lead quench can be used in the present process, although one of the advantages of the instant process is that a sodium quench, which produces more dross than the lead quench, can be economically employed. Sodium recovery from the dross is a must with the use of a sodium quench, not only because of increased amounts of dross, but also because the metal values contained therein are entirely sodium.

The hot fluid flux which has been drawn off from the bottom of the reservoir is reacted with carbon monoxide gas in any one of several ways. Referring now to the accompanying drawing, one preferred way is to direct the molten flux through the valve 10 into line 11. The hot carbon monoxide gas from the condenser is directed through valve 13 into line 14 which interconnects with line 11 so that the carbon monoxide and hot flux are intermingled while the flux is still fluid and at a temperature of at least 318° C. The reaction between the carbon monoxide gas and the sodium hydroxide in the flux is quite rapid and the material may then be passed directly into the reactor along with added carbon to produce additional sodium. An alternate way of reacting the hot flux with the carbon monoxide is to direct the flux through valve 10 into line 12 which leads the flux into admixture with the fresh charge materials. The mixture is pelletized (or formed into briquettes) and carbonized. The briquettes are then heated gradually to temperatures in excess of 318° C. Valve 13 is regulated to direct carbon monoxide through line 15 and into contact with the heated briquettes. This converts the sodium hydroxide to the higher melting sodium carbonate before the briquettes lose shape. Alternatively the carbonizing can be done in an atmosphere of carbon monoxide and at temperatures of at least 318° C., thereby combining these two steps.

The advantages of the present invention may be further appreciated by reference to a material balance of the process outlined in the accompanying flow sheet. As an example, two pounds of sodium carbonate and 0.45 pound of carbon (in the form of coke and pitch) fed to the reactor and treated with 0.70 pound of sodium hydroxide in the reservoir, as above described, produces 1.18 pounds carbon monoxide, 0.70 pound sodium and 1.27 pounds of flux. When this 1.27 pounds of flux is combined with 0.245 pound of carbon monoxide, the 0.70 pound of sodium hydroxide reacts therewith to produce 0.927 pound of sodium carbonate. Thus this cyclical operation is self-sufficient with the exception that carbon, pitch and small amounts of sodium carbonate need be added.

While neither the carbothermic reaction for producing sodium nor the reaction of carbon monoxide with sodium hydroxide to produce sodium carbonate is economical when practiced individually, their combination in the cyclical process comprising the present invention produces a highly efficient procedure which effects a recovery approximating 100 percent of all of the sodium values present.

It will be obvious from the above detailed description that the present invention comprises a cyclical process for producing sodium in which almost all of the sodium values are recovered. A primary advantage of this process resides in the use of fluid flux while still molten and the hot moisture-free carbon monoxide gas to produce sodium carbonate. Under the conditions of the present invention, this reaction is highly economical and combines two waste byproducts to provide a charge material that can be directly introduced into the single reactor employed.

What is claimed is:

1. In a process for producing sodium which comprises reducing sodium carbonate with carbon in a high temperature reactor to produce sodium vapor and carbon monoxide, condensing the sodium vapor to produce molten sodium and a dross consisting principally of sodium carbonate and carbon, fluxing the dross from the molten sodium with sodium hydroxide and separating the flux from said molten sodium, the improvement which comprises the steps of contacting the flux with carbon monoxide gas at a temperature of at least 318° C. to produce sodium carbonate, and reacting the thus treated flux in the high temperature reactor with added carbon to produce additional sodium.

2. In a process for producing sodium which comprises reducing sodium carbonate with carbon in a high temperature reactor to produce sodium vapor and carbon monoxide, condensing the sodium vapor to produce molten sodium and a dross consisting principally of sodium carbonate and carbon, fluxing the dross from the molten sodium with sodium hydroxide and separating the flux from said molten sodium, the improvement which comprises contacting the flux at a temperature of at least 318° C. with by-product carbon monoxide gas from the aforementioned reactor to convert substantially all of the sodium hydroxide in the flux to sodium carbonate, and reacting the thus treated flux with added carbon in said reactor to produce additional sodium.

3. In a process for producing sodium comprising reacting sodium carbonate with carbon in a high temperature reactor to produce sodium vapor and carbon monoxide, condensing the sodium vapor to produce a mixture of molten sodium and a dross consisting principally of sodium carbonate and carbon, fluxing the dross from the molten sodium by adding sodium hydroxide to said mixture and separating the molten sodium from the hot fluid flux, the improvement which comprises contacting said flux while still in the hot fluid state with carbon monoxide gas generated in the high temperature reactor to convert substantially all of the sodium hydroxide in the flux to sodium carbonate, and reacting the thus treated flux with carbon in the aforementioned high temperature reactor to produce more sodium.

4. In a process for producing sodium which comprises charging sodium carbonate and carbonaceous material into a high temperature reactor to produce sodium vapor and carbon monoxide, condensing the sodium vapor to produce a mixture of molten sodium and a dross consisting principally of sodium carbonate and carbon, fluxing the dross from the molten sodium by adding sodium hydroxide to said mixture and separating the molten sodium from the hot fluid flux, the improvement which comprises adding the flux to the sodium carbonate and carbonaceous charge materials, contacting the flux in the charge materials with carbon monoxide gas evolved from said reactor at a temperature of at least 318° C. to convert substantially all of the sodium hydroxide in the flux to sodium carbonate, and introducing the thus treated charge materials into said reactor to produce additional sodium.

5. In a process for making sodium comprising reacting sodium carbonate with carbon in a high temperature reactor maintained at a temperature between 850° C. and 1300° C. to produce sodium vapor and carbon monoxide, condensing the sodium vapor with a quench metal maintained at a temperature between 290° C. and 500° C. to produce a mixture of molten sodium and a dross consisting principally of sodium carbonate, carbon and occluded sodium, fluxing the dross from the molten sodium by adding sodium hydroxide to said mixture and separately removing the molten sodium and the hot fluid flux from the high temperature reactor, the improvement of converting the process to a cyclical operation which comprises the steps of reacting the flux in a fluid state with carbon monoxide gas which has been evolved from said high temperature reactor to convert substantially all of the sodium hydroxide to sodium carbonate, and feeding the thus treated flux into the high temperature reactor along with added carbon to produce additional sodium.

6. The process as defined in claim 5 wherein the quench metal is sodium.

7. In a process for making sodium comprising reacting sodium carbonate with carbon in a high temperature reaction maintained at a temperature of about 1200° C. and at a pressure of from 0.5 to 1 atmosphere to produce sodium vapor and carbon monoxide, condensing the sodium vapor with molten sodium at a temperature of about 300° C. and a pressure of 0.03 atmosphere to produce a mixture of molten sodium and a substantial amount of dross consisting principally of sodium carbonate, carbon and occluded sodium, fluxing the dross from the molten sodium at a temperature varying from 360° to 380° C. by adding sodium hydroxide to said mixture and separating the flux from the molten sodium, the improvement which comprises contacting the flux at a temperature of at least 318° C. with by-product carbon monoxide gas from the aforementioned reactor to convert substantially all of the sodium hydroxide in the flux to sodium carbonate, and reacting the thus treated flux with added carbon in said reactor to produce additional sodium.

References Cited in the file of this patent

UNITED STATES PATENTS

| | | |
|---|---|---|
| 2,391,728 | McConica et al. | Dec. 25, 1945 |
| 2,774,663 | Kirk | Dec. 18, 1956 |